INVENTOR
MAURICE MOISE LEVY
BY [signature]
ATTORNEY

Jan. 3, 1956 M. M. LEVY 2,729,701

PULSE CODE MODULATION SYSTEMS

Filed Aug. 11, 1950 4 Sheets-Sheet 2

INVENTOR

Maurice Moise Levy

BY Elfonn Spinkstein

ATTORNEY

INVENTOR
Maurice Moise Levy
BY [signature]
ATTORNEY

INVENTOR
MAURICE MOISE LEVY

BY [signature]
ATTORNEY

United States Patent Office 2,729,701

Patented Jan. 3, 1956

2,729,701

PULSE CODE MODULATION SYSTEMS

Maurice Moïse Levy, London, England, assignor to The General Electric Company Limited, London, England Application August 11, 1950, Serial No. 178,768

Claims priority, application Great Britain August 15, 1949

5 Claims. (Cl. 178—43.5)

Figures 1, 2:
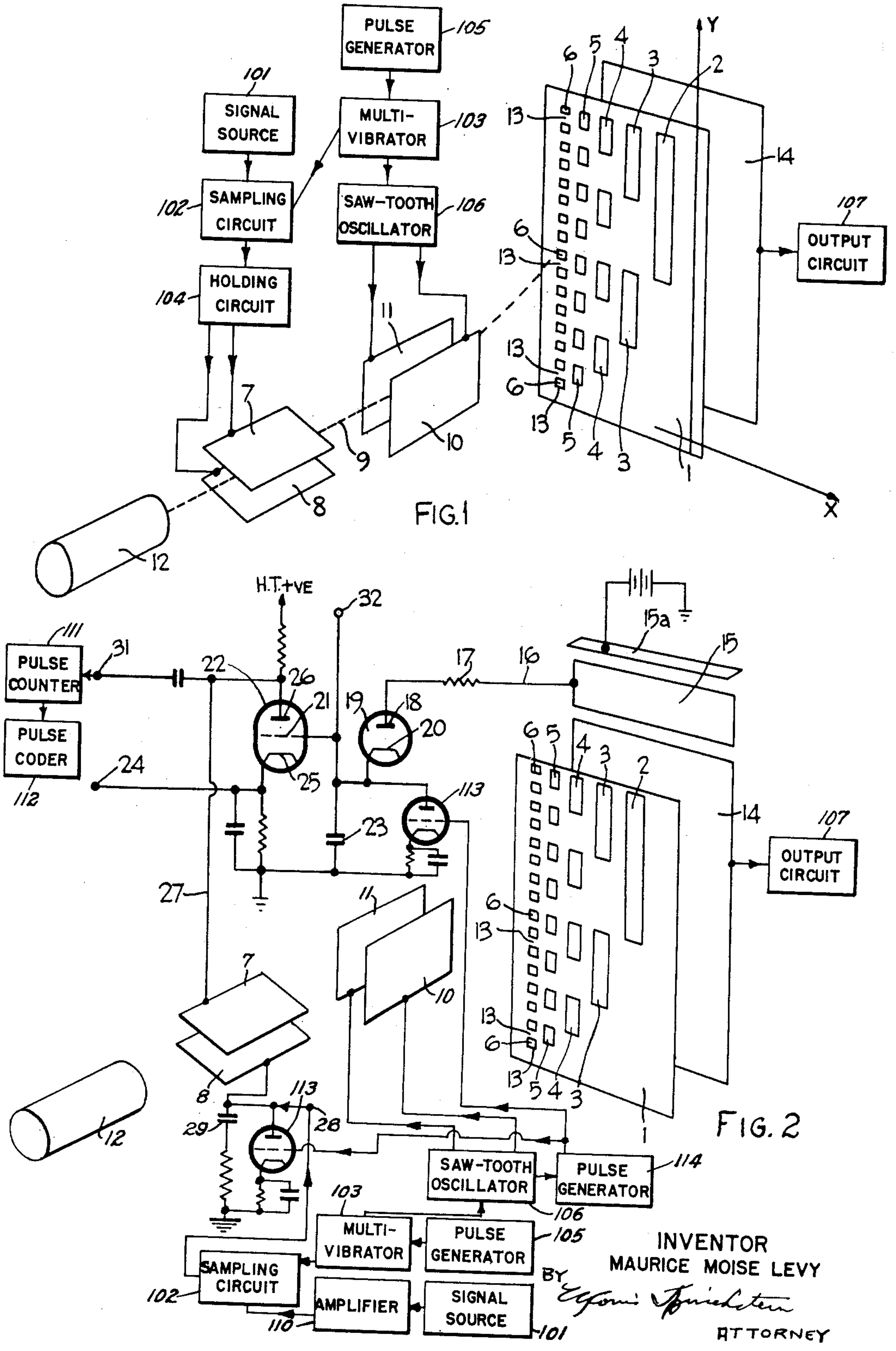

The present invention relates to pulse code modulation systems.

In a pulse code modulation signalling system intelligence on a channel is conveyed by a series of trains of recurrent (and usually regularly recurrent) pulses, the particular pulse trains transmitted being determined by the intelligence which it is desired to transmit. Such systems have an advantage in that the intelligence represented is unaffected by relatively large variations in the amplitude, width and shape of the pulses, such as may be caused by interference.

The pulses in a single train may be distinguished from one another by the times of their occurrence, by the radio frequency of the oscillation which they modulate or otherwise. For convenience of description it will be assumed in this specification that the pulses in a train which will be referred to as coded pulses, are distinguished from one another by their times of occurrence but it is to be understood that the invention is not limited to this feature. Moreover it will be assumed for the sake of convenience in description that the pulses transmitted by the system are electrical although, again, this is not necessary; they may for example be pulses of pressure in a fluid, which, however, would usually be generated by first generating electrical pulses.

In one known multichannel signalling system using pulse code modulation, each channel is allotted a separate time interval, referred to as the channel interval, all the channel intervals being regularly recurrent and being interlaced with one another. For each channel, pulse trains are employed which consist of combinations, including that in which no pulse is selected, selected from five equally-spaced pulses of like amplitude, width and shape, the particular combination selected depending on the intelligence to be transmitted, and the pulse trains representing the intelligence on a particular channel being transmitted successively one train during each of the recurrent intervals allotted to that channel. In the said system there are therefore thirty-two different pulse trains which can be employed, and in general if there are $n$ possible pulses in each train, the number of different pulse trains obtainable is given by $2^n$.

It will be assumed that the intelligence to be transmitted is the instantaneous amplitude of a signal voltage. Using the system described above in which each pulse train is a combination selected from five pulses, thirty-two distinct values of such amplitude can be represented therefore, which values may include zero amplitude. The first step in transmitting the intelligence consists in what is known as quantising the instantaneous values at recurrent intervals of time corresponding to the channel recurrence interval, of the amplitude of the wave, that is to say giving to each of these instantaneous values the nearest higher or lower (usually the lower) one of a chosen thirty-two fixed values. The coded pulse trains are then generated to represent these quantised values. In general, where each pulse train is a combination selected from $n$ pulses, the number of distinct amplitude values that can be represented, which may include zero amplitude, is equal to $2^n$. In the particular case where $n=5$, if the pulse positions within the channel interval are numbered 1 to 5 in order of occurrence, zero amplitude may for example be represented by no pulses; amplitude value 1 may be represented by a pulse occurring in position 1; amplitude value 2 may be represented by a pulse occurring in position 2; amplitude value 3 may be represented by pulses occurring in positions 1 and 2, and so on.

The usual method of transmitting such pulse trains is by radio and in that case each pulse in the trains is represented by a burst of radio-frequency oscillation.

So long as the number of different fixed values to be represented by the system is not too large, existing methods and apparatus can be operated satisfactorily. For instance over a hundred such values can be satisfactorily dealt with. For greater numbers of values, say a thousand or more, the apparatus however becomes complex and difficult, if not impossible, to construct and operate with sufficient accuracy.

It is an object of the present invention to overcome this difficulty.

According to the present invention a pulse code modulation system for periodically generating coded pulses representative of the instantaneous value of a magnitude which may vary within a given range R, comprises means for periodically sampling the instantaneous value of said magnitude, coding means for generating a first train of coded pulses representative of the instantaneous value of said magnitude to a first degree of accuracy, and a second coding means for generating a second train of coded pulses representative, to a higher degree of accuracy than said first degree, of the difference between the value of said magnitude represented by said first train of pulses and the said instantaneous value of said magnitude.

According to a feature of the present invention a method of generating coded pulses representative of the instantaneous value of a magnitude which may vary within a given range R, comprises the process of generating a first train of coded pulses representative of the nearest one, either above or below the instantaneous value of said magnitude, of a set of M fixed values which are distributed at intervals and define a range at least equal to the range R, and the further process of generating a second train of coded pulses representative of the nearest one, either above or below the instantaneous value of said magnitude, of a set of $m$ fixed values which are distributed at intervals over the range defined by the two consecutive ones of the set of M fixed values lying nearest above and below the instantaneous value of said magnitude.

The set of M fixed values may be distributed at uniform intervals and define a range coincident with the given range R. The set of $m$ fixed values distributed over each range defined by two consecutive ones of the set of M fixed values may be distributed at uniform intervals over each said range.

The method may be extended further as many times as desired by generating further trains of pulses. Thus, for example, extending the method once, a method according to the invention may include the process of generating a third train of coded pulses representative of the nearest one, either above or below the said magnitude, of a set of $p$ fixed values which are distributed at intervals over the range defined by the two consecutive ones of the set of $m$ fixed values lying nearest above and below the said magnitude.

The operation of the method according to the present invention is based upon the following considerations. It will be assumed to be desired to represent by coded pulses the instantaneous amplitude of a signal voltage, the amplitude being within a range R and to distinguish between say about a thousand different equally spaced amplitude values within this range. The approximate position of a given amplitude value within the range can first be determined by using a coarse subdivision of the range, say into thirty-two parts each of extent equal to $R/32$ by a set of thirty-two fixed values distributed over the range R. A train of coded pulses, one of the thirty-two different trains which may be obtained by selecting combinations from five pulses spaced in time may then be generated in any known manner to represent the one of the thirty-two fixed values which has nearest above or below (usually below) the given amplitude. The difference between the given amplitude and this nearest fixed value above or below it can then be determined and this difference can be treated in the same way as the original amplitude, by considering a range $R_1$ equal to $R/32$ instead of the range R. If this range $R_1$ be divided into say thirty-two equal parts by a set of thirty-two fixed values distributed over it the position of the given amplitude within the range $R_1$ can be represented by a second train of coded pulses one of the thirty-two different trains which may be obtained by selecting combinations from a further five pulses spaced in time. The number of different amplitude values that can be represented in this way is therefore $32\times32=1024$ and nevertheless the complexity of the apparatus and the accuracy with which it has to be operated is scarcely greater than that which is needed for representing only thirty-two different values. The process can of course be repeated, by dividing each of the thirty-two subdivisions of the range $R_1$ and so on.

Figure 3:
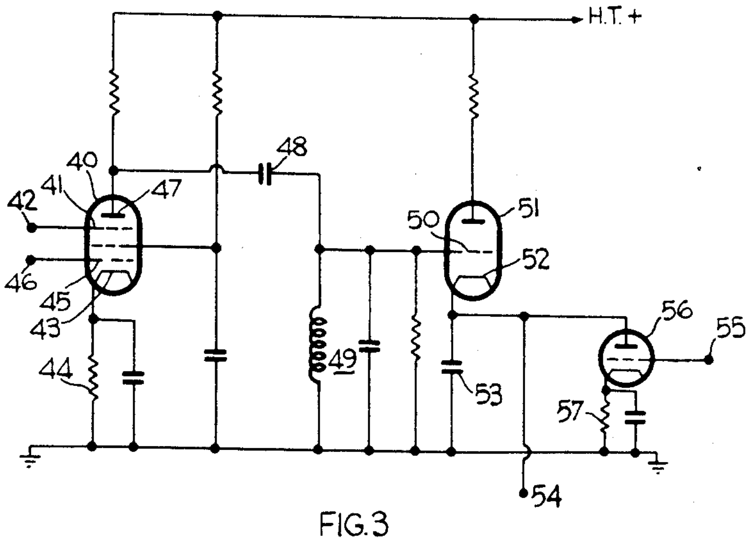
Figure 4:
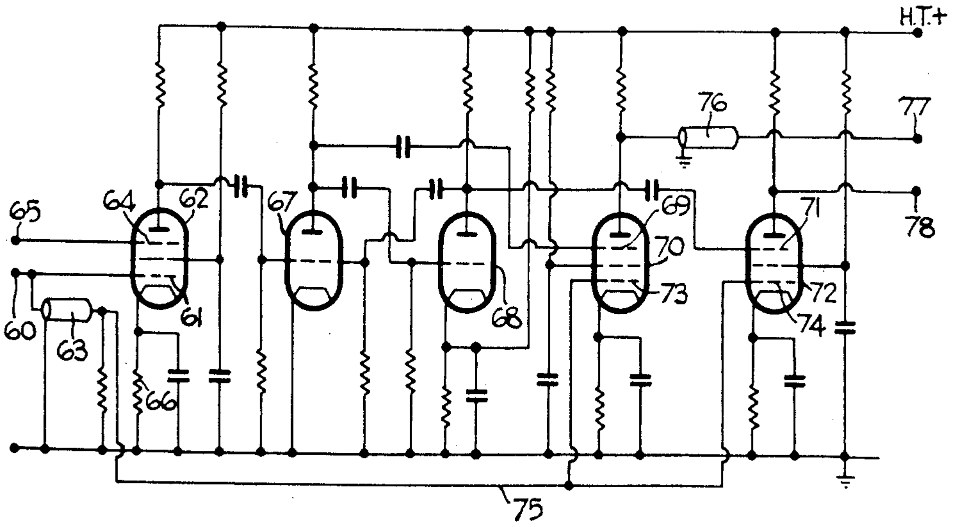
Figure 6:
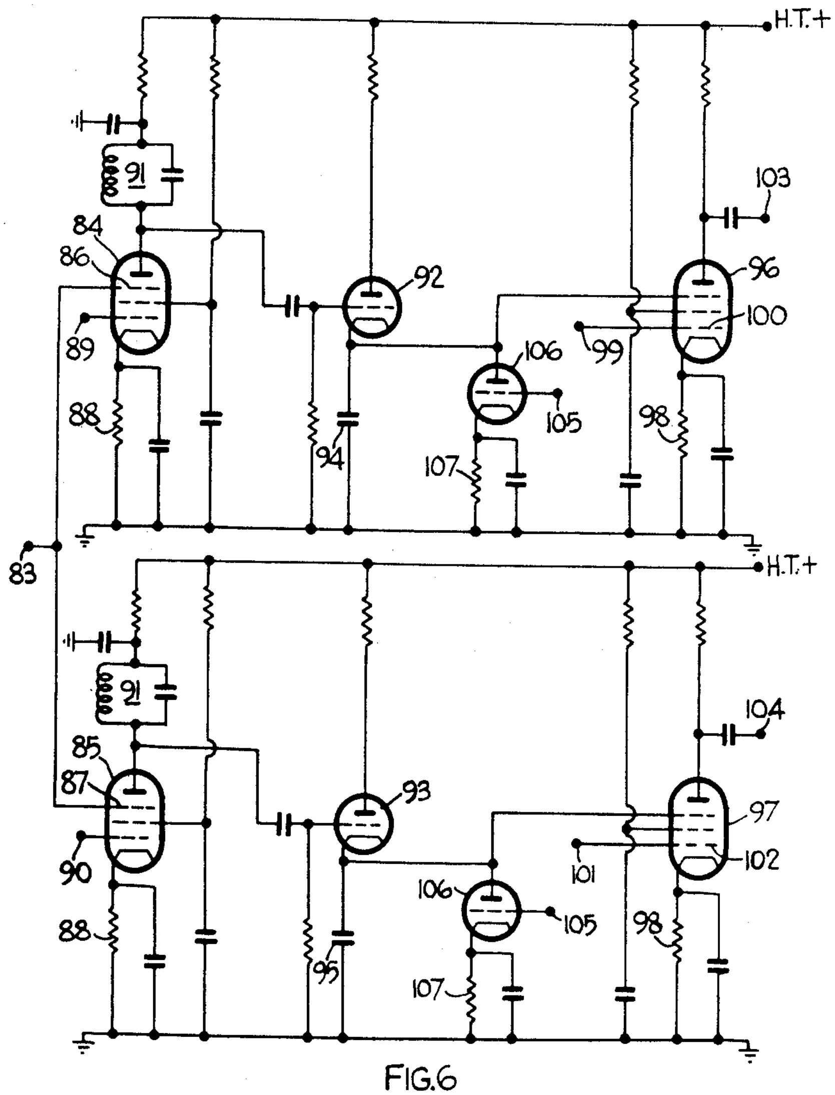
Figure 5:
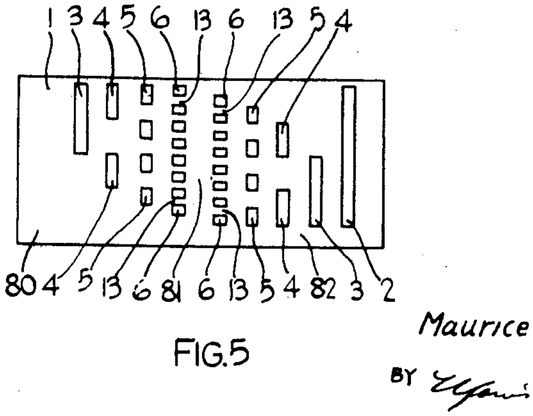
Figure 7:
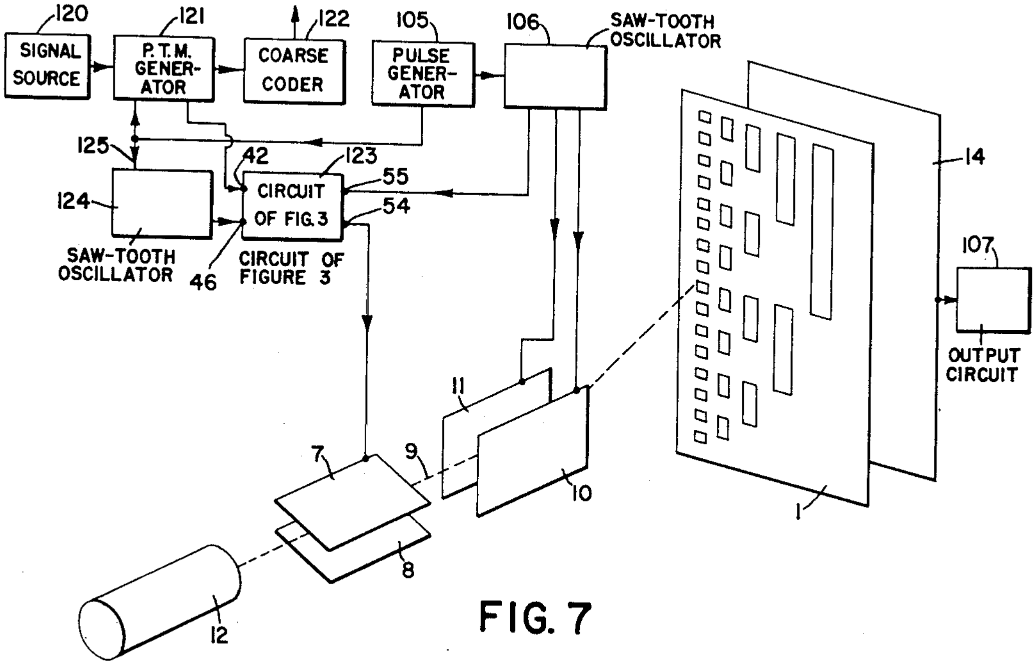
Figure 8:
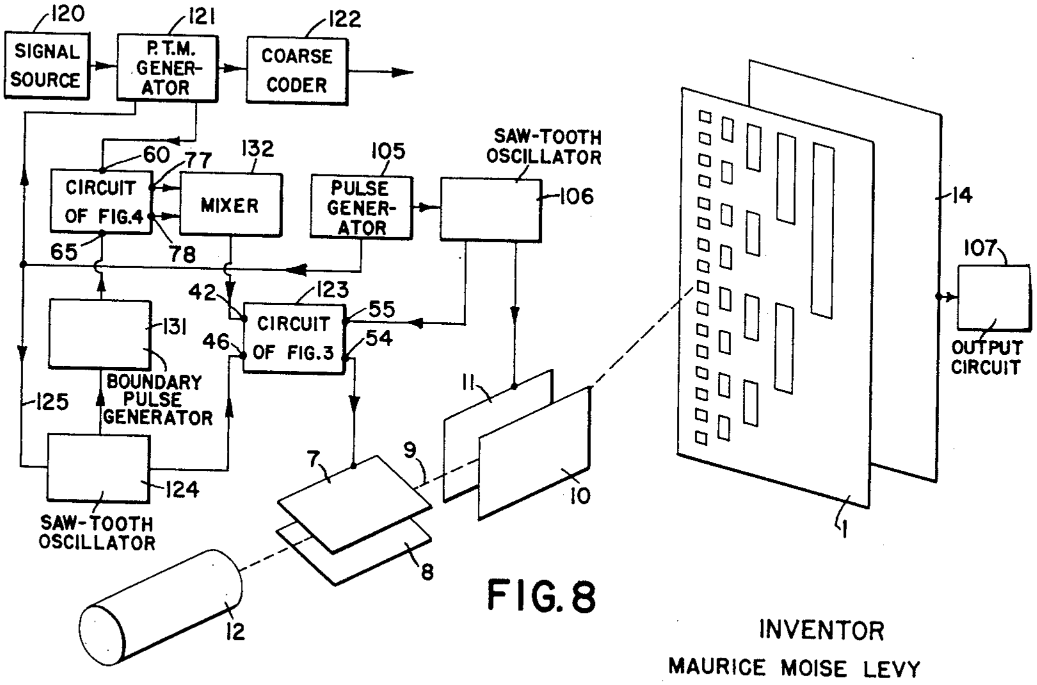

The invention will be described by way of example as applied to the form of pulse code modulation system described in a paper by R. W. Sears in The Bell System Technical Journal of January 1948, pages 44 to 57, with reference to the accompanying drawings in which:

Figure 1 shows a diagrammatic representation of parts of the said known pulse code modulation system, Figure 2 shows a diagrammatic representation of the said known pulse code modulation system modified for use according to the present invention, Figure 3 shows a diagram of a circuit for use in a further method according to the present invention, Figure 4 shows a diagram of a circuit for overcoming errors which may occur in the use of the circuit shown in Figure 3, Figure 5 shows a modified form of coding plate, Figure 6 shows a diagram of a circuit for use in a system including the modified form of coding plate, and Figures 7 and 8 are views similar to Figure 1 of circuits embodying modified forms of the present invention.

The system described in the said paper comprises a cathode ray tube which is illustrated diagrammatically in Figure 1 of the accompanying drawings. Within the envelope of the cathode ray tube a coding plate 1 is provided having a number of apertures 2, 3, 4, 5 and 6 arranged in columns, there being one aperture 2 in the right hand column, two equal apertures 3 in the second column from the right, four equal apertures 4 in the third column, eight equal apertures 5 in the fourth column and sixteen equal apertures 6 in the left hand column. The apertures 3, 4, 5, and 6 are each half as long as the apertures 2, 3, 4 and 5 respectively in the neighbouring column to the right. For the purposes of this description, the Y axis of the cathode ray tube will be taken as being parallel to the columns of apertures 2, 3, 4, 5 and 6, and the X axis as perpendicular to the said columns and in the plane thereof the origin lying near the bottom right hand corner of the plate 1 as shown in Figure 1. A pair of deflecting plates 7, 8, which will be designated the upper deflecting plate 7 and the lower deflecting plate 8, are provided and arranged so that voltages applied to them may deflect the cathode ray beam, indicated by the track 9, across the coding plate 1 in directions parallel to the Y axis. Similarly a right deflecting plate 10 and a left deflecting plate 11 are provided and arranged so that voltages applied to them may deflect the cathode ray beam across the coding plate 1 in directions parallel to the X axis. The cathode ray beam source 12 may take any known and suitable form, and is provided with beam acceleration, focussing and intensity controlling arrangements.

When the apparatus is used to generate pulse trains representative of the amplitude of a signal voltage, the signal voltage is applied from a signal voltage source 101 to a sampling circuit 102, which under the control of a multivibrator circuit 103 repeatedly samples the signal voltage and delivers short amplitude modulated pulses recurrent at the sampling frequency to the holding circuit 104. The sampling frequency must be at least twice as great as the maximum frequency component of the signal voltage, if the latter is to be transmitted without distortion. Each time a pulse is applied to the holding circuit 104 it applies a voltage proportional to the amplitude of the pulse to the plates 7 and 8, and holds the voltage so applied until the occurrence of the next succeeding pulse when the voltage changes to a value proportional to the amplitude of that pulse. The multivibrator circuit 103 is itself controlled by a master pulse generator 105. The voltages applied to the deflecting plates 7 and 8 cause the cathode ray beam to be deflected up and down the coding plate 1 parallel to the Y axis and to one side of the apertures 2—6. Between the occurrence of each amplitude modulated pulse a sawtooth voltage pulse, generated by the sawtooth oscillator 106, which is also controlled by the master pulse generator 105 is applied to the plates 10 and 11, to sweep the cathode ray beam parallel to the X axis across the columns of apertures 2—6, and then return it to the said one side of the apertures 2—6. The sweep across the apertures 2—6 will be at a level on the coding plate 1 depending on the voltage at which the deflecting plates 7 and/or 8 are being held. The holding circuit 104 may simply be a condenser connected between the deflecting plates 7 and/or 8 and earth. It will be appreciated that deflecting voltages may be applied to only one of each pair of deflecting plates if desired instead of both.

An arrangement, which is not shown in Figure 1 for the sake of clarity, but is fully described in the aforesaid paper, is provided comprising a wire grid in front of the coding plate 1 and a feedback path to the deflecting plates 7 and 8 from the said grid, which arrangement "quantises" the deflection of the cathode ray beam parallel to the Y axis so that for a given signal voltage applied to the deflecting plates 7 and 8 the beam is deflected according to the nearest voltage value above or below the given signal voltage of a set of thirty-two voltage values distributed at uniform intervals over the permissible signal voltage range. The thirty-two voltage values are chosen so that the beam is deflected to one of the thirty-two levels parallel to the X axis on the coding plate 1 which are either opposite an aperture 6 or a space 13 below the apertures 6. If it is arranged that the beam is deflected up the side of the coding plate 1 to the left of the apertures 6, a subsequent sweep of the beam across the coding plate 1 parallel to the X axis, will traverse a different combination of apertures 2, 3, 4, 5 and 6 in the five columns according to which of the said thirty-two levels the beam has been deflected. Thus for example in the uppermost level the beam will traverse an aperture 2, 3, 4, 5 or 6 of each column, in the next lower level it will traverse a space 13 in the first column and an aperture 2, 3, 4 or 5 in each other column, and so on. In the lowest but one level the beam will traverse an aperture 6 only and in the lowest level it will traverse no apertures 2—6 at all. A collecting electrode 14 is supported behind the coding plate 1 from the cathode ray beam source 12, and when the beam passes over an aperture 2—6 a pulse of electrons will pass through the aperture 2—6 and travel on to the collecting electrode 14. The pulses from the collecting electrode 14 are applied to a pulse output circuit 107 which may include amplifying, shaping, modulating etc. circuits as required depending on the form of transmission used in the system of which the pulse code modulator forms part.

The known pulse coding apparatus described in outline above provides a method of representing the amplitude of a signal wave by combinations selected from five recurrent pulses, but the instantaneous amplitude represented is quantised to the nearest above or below it of thirty-two fixed values. To increase the accuracy of the representation it would be necessary to increase the number of columns of apertures each new column having twice as many apertures as the preceding one. This process cannot be extended indefinitely since either the apertures become too small for acceptable accuracy limits to be possible or the cathode ray tube becomes uneconomically large.

One way of applying the present invention to this known pulse code modulation system will now be described with reference to Figure 2 of the accompanying drawings, in which parts appearing in Figure 1 are designated as in that figure, and for convenience of description certain numerical values will be assumed. These values are not to be taken as in any way limiting the scope of the invention. Assuming then that the range R of amplitude to be represented, which range R extends in one direction from zero amplitude, is first divided into thirty-two equal parts by a set of thirty-two fixed values and that each of these parts is sub-divided into thirty-two equal parts by a set of thirty-two fixed values, the amplitude of the maximum voltage applied to the lower deflecting plate 8 only, to deflect the beam vertically upwards is made thirty-two times that employed in the known pulse code modulation system. This may be achieved, in known manner, by use of a signal amplifier 110 inserted in the circuit between the signal source 101, and the sampling circuit 102.

A further collecting electrode 15, adapted to emit secondary electrons to a collecting electrode **15*a* which is held at a positive potential with respect to the collecting electrode 15 to attract the said secondary electrons, is arranged in the plane of the collecting electrode 14 and above it so that the cathode ray beam, as it is deflected vertically upwards, strikes the collecting electrode 15 when it has been deflected just above the level of the uppermost of the apertures 2—6. The collecting electrode 15 is connected by a lead 16 which passes through the cathode ray tube envelope to one terminal of a resistor 17. The other terminal of the resistor 17 is connected to the anode 18 of a thermionic diode valve 19, the cathode 20 of which is connected to the control grid 21 of a thermionic valve 22. The control grid 21 is also connected to one terminal of a storage condenser 23, the other terminal of which is earthed. A bias voltage, applied to the terminal 24 by a lead from a suitable voltage source, is thereby applied to the cathode 25 of the valve 22 to maintain the anode current at a low value or zero when there is no charge on the condenser 23. The anode 26 is connected to the upper deflecting plate 7 by the lead 27 which passes through the cathode ray tube envelope. It will be appreciated that although the valve 22 is shown as a triode, this is only for example, and it might equally be a tetrode or a pentode having the additional grids connected in known manner, and that both the valves 19 and 22** are connected in conventional manner to filament supplies, high tension voltages etc. as necessary.

In operation, the output of the sampling circuit 102, that is a train of short recurrent amplitude-modulated voltage pulses, is applied as a negative going voltage at the terminal 28. The terminal 28 is connected to the lower deflecting plate 8, and also to one terminal of a condenser 29 the other terminal of which is connected through a resistor 30 to earth. The circuit formed by the condenser 29 in series with the resistor 30, replaces the holding circuit 104 of the known pulse code modulation system, and has the effect that after the application of a voltage pulse to the terminal 28, the voltage applied to the lower deflecting plate 8 falls from zero slowly to its final value. As the said voltage falls from zero the cathode ray beam, of which the undeflected position on the coding plate 1 is to the left of the column of apertures 6 and on the lowest of the thirty-two fixed levels, is deflected upwards and eventually passes off the top of the coding plate 1 and strikes the collecting electrode 15 (which occurs when the deflecting voltage has reached one thirty-second of the maximum voltage R with which the system is to deal) from which secondary electrons are emitted in greater number than the primary electrons striking it so that a positive voltage pulse is applied to the grid 21 of the valve 22 and therefore a negative voltage step is applied to the upper deflecting plate 7, which serves to return the cathode ray beam to its starting point. The amplification of the valve 22 is arranged so that the voltage step applied to the upper deflecting plate 7 is of the necessary amplitude to return the cathode ray beam to its undeflected position. The storage condenser 23 remains positively charged and maintains the grid 21 slightly less negative relative to the cathode 25 than before. After the negative voltage step is applied to the upper deflecting plate 7, the cathode ray beam is deflected upwards again owing to the still decreasing negative voltage applied to the lower deflecting plate 8 and the process when it again strikes the collecting electrode 15 as described above is repeated. The cathode ray beam is thus deflected a number of times up to the collecting electrode 15 returning each time to its starting point, the number of times it strikes the collecting electrode 15 being determined by the magnitude of the final voltage applied to the lower deflecting plate 8. Each occasion of striking the collecting electrode 15 results in a quantum of charge accumulating on the storage condenser 23. The charge on the condenser 23 and the voltage on the anode 26 of the valve and the upper deflecting plate 7 are dependent upon the number of these occasions. The voltage pulses at the anode 26 of the valve 22 are passed by a lead connected to the terminal 31 to a pulse counting device 111 and the number of pulses counted by this device represents the value of the final voltage applied to the lower deflecting plate 8 to the nearest one below it of the thirty-two fixed values of the range R. The output of the counting device 111 is converted into coded pulses in any convenient way (as for example is described in an article by U. S. Black and J. O. Edson in Electrical Engineering (U. S.), volume 66, 1947, pages 1123–1125), in pulse coder 112.

Assuming that the final voltage applied to the lower deflecting plate 8 is not an exact number of thirty-seconds of R, the cathode ray beam will come to rest at a level above its undeflected position dependent upon the difference between the value of the final voltage and the next lower one of the thirty-two fixed voltage values and on the "quantising" arrangement. As in the system described in the above-mentioned paper, a sawtooth deflecting voltage is then applied from the sawtooth oscillator 106 between the right and left hand deflecting plates 10 and 11 to cause the cathode ray beam to sweep over the apertures on that level. The coded pulses so generated on the collecting electrode 14 will then represent the said level and consequently the difference between the value of the final quantised voltage and the value of the next lower one of the thirty-two divisions. Circuits, each comprising a triode valve 113 which is normally non-conducting but is rendered conducting for the duration of a short pulse applied from pulse generator 114 at the end of each sawtooth generated by the sawtooth oscillator 106, are provided to discharge each of the storage condensers 23 and 29 when the coded pulses have been generated, in order to prepare the system for the generation of the next train of pulses in a similar manner.

The train of coded pulses generated by the cathode ray tube system and that generated by the coding device 112 may be transmitted in any suitable way, for example by arranging that they are conveniently spaced apart in time and transmitting them over a single channel. These two trains of coded pulses may form a group which is transmitted during one of the intervals allotted to a single channel in a multichannel signalling system, similar groups representative of intelligence in the other channels being transmitted during their respective intervals.

In a modified arrangement, of which a block diagram is shown in Figure 7 according to this invention, and one that is at present preferred, a signal voltage to be represented by coded pulses is first applied from a signal source 102 to any known form of circuit 121 to produce time-modulated pulses of constant amplitude under the control of the pulse generator 105. All voltages within the range R will then be represented by times of occurrence of pulses. The given recurring interval during which the pulses from the pulse time modulator 121 occur can be divided into say thirty-two divisions and it can readily be determined by known means in which of the thirty-two time divisions a given pulse occurs. The number of this division can then be converted in known manner into coded pulses. This part of the arrangement is represented in Figure 7 by the coarse coder 122.

In order to transmit a second train of coded pulses representing the time difference between the time of occurrence of the pulse and say the earlier boundary of the time division in which the pulse occurs, the circuit which is shown in Figure 3 of the accompanying drawings and is represented by the block 123 in Figure 7 may be used. The said time difference is however only represented by coded pulses representing the nearest one, earlier or later (in this example earlier) than the time occurrence of the pulse, of a set of thirty-two equally spaced fixed instants dividing the said time division into thirty-two subdivisions. The circuit comprises a thermionc valve 40, which may conveniently be a pentode and is shown as such in Figure 3, and to the suppressor grid 41 of which the time modulated pulses are applied in a positive sense, the output of the pulse-time modulator 121 being connected across the terminal 42 and earth. The cathode 43 of the valve 40 is connected to earth through a biassing resistor 44 which normally maintains the valve 40 below anode current cut-off. To the control grid 45, there is applied a sawtooth voltage oscillation from an oscillator 124 the output of which is connected across the terminal 46 and earth. The output of the sawtooth oscillator 124 is synchronised with the above-mentioned time divisions of the recurring intervals during which the time-modulated pulses occur by pulses applied over the lead 125, the oscillation having a period equal to these time divisions and the rapid return stroke of the sawtooth oscillation coinciding with the boundaries between the time divisions. The sawtooth voltage oscillation applied between the terminal 46 and earth is arranged to vary in a positive direction from zero voltage, and the biasing of the valve 40 by the resistor 44 is arranged so that with the sawtooth voltage at zero, the application of one of the time-modulated pulses to the suppressor grid 41, will just cause the valve 40 to conduct and produce a very small negative voltage pulse at the anode 47. If the sawtooth voltage applied to the control grid 45 is greater than zero, there will be a correspondingly larger negative voltage pulse at the anode 47. Thus the magnitude of the negative voltage pulse at the anode 47 will depend on the time of occurrence of the time-modulated pulse within the time division in which it falls; the further the pulse is from the earlier boundary of the division, the greater will be the negative voltage pulse. It will be appreciated that besides the above-mentioned connections, the valve 40 is also connected conventionally to heater, anode and screen grid voltage supplies.

The variable amplitude negative pulses at the anode 47 of the valve 40 are applied through a coupling condenser 48, to shock-excite a tuned circuit 49 into damped oscillation. The shock-excited damped oscillations are applied between the control grid 50 of the thermionic valve 51 and earth and their amplitude depends on the amplitude of the negative pulse applied to the tuned circuit 49. The cathode 52 of the valve 51 is connected to one terminal of a condenser 53 the other terminal of which is connected to earth. The first half-cycle of each train of damped oscillations has no effect of the valve 51, since it is negative-going. The second half-cycle, however, which is positive-going, causes current to flow in the valve 51 and charges the condenser 53 to a value depending on the amplitude of the particular second half-cycle involved. Thus the condenser 53, assuming that it is discharged at some instant after the occurrence of each of the time-modulated pulses, becomes charged to a value depending on the time elapsing between the earlier boundary of the time division in which the pulse occurs and the time of occurrence of the pulse itself. The voltage appearing on the terminal 54 due to the charging of the condenser 53 is applied to the upper deflecting plate 7 of a known cathode ray tube coding device with which is associated a sawtooth oscillator 106 controlled by pulse generator 105 as previously described with reference to Figure 1 of the accompanying drawings, and a second train of coded pulses is thereby produced representing the nearest earlier one of the thirty-two subdivisions of the time division in which the time-modulated pulse occurs.

In order to discharge the condenser 53, after the sawtooth voltage has been applied between the left and right deflecting plates 10 and 11 of the cathode ray tube a positive pulse occurring for example at the same time as the return stroke of the sawtooth voltage and derived from the oscillator 106 is applied between the terminal 55 and earth of the circuit 123 and thus to the grid of a thermionic valve 56 which is a triode biased by the cathode resistor 57 to be normally non-conducting to its anode, which is connected to the cathode 52 of the valve 51. The pulse causes the valve 51 to conduct and the condenser 53 is then discharged by the current flowing in it.

A difficulty arises with the circuit just described when the period of the sawtooth voltage oscillator 124 is small, for instance of the order of 0.5 microsecond or less, as may be required. This is because it is not easy to make the relatively slowly rising part of the sawtooth wave substantially rectilinear, as is required, and at the same time to make the return stroke sufficiently rapid. If the return stroke is not very rapid there is a substantial range of time over which faulty coding will occur owing to a time-modulated pulse occurring during a return stroke.

When the return stroke can be made so rapid that the error introduced by its duration is negligible, false coding owing to occurrence of a time-modulated pulse coinciding with the return strokes can be avoided by the following method. The time modulated pulses are applied to a delay circuit introducing a time delay which is a suitable small fraction of the pulse recurrence period. The delayed pulses are combined with the original pulses to form pairs of pulses. The first pulses of the pairs are used as exploring pulses to determine whether there is coincidence between the return stroke and themselves or not and if there is such coincidence to introduce a slight delay in the pulses sufficient to prevent false actuation of the coded pulse train generator but insufficient to introduce an objectionable error, that is by delaying the pulses by a time shorter than the first subdivision of the following time division.

One circuit for carrying out the above method will now be described with reference to Figures 4 and 8 of the accompanying drawings, the circuit of Figure 4 being shown as a block circuit 130 in Figure 8 and the parts of Figure 8 which are identical with parts of Figures 1 and 7 being given the same references as in those figures. The output of the time-modulated pulse generator 121 is applied between the terminal 60 and earth as positive voltage pulses. The terminal 60 is connected directly to the control grid 61 of a thermionic valve 62, which is a pentode. There is also a connection from the terminal 60 through a delay line 63, which is represented diagrammatically in Figure 4 as a length of coaxial transmission line. Across the end of the delay line remote from the terminal 60 a voltage pulse appears delayed slightly on that applied to the control grid 61. The two pulses, the one applied to the control grid 61 and that at the said end of the delay line will be referred to as a pair of pulses. Thus the earlier one of each pair of voltage pulses is applied to the control grid 61, and the later one of each pair of pulses appears across the said end of the delay line. The spacing of the pairs of pulses remains substantially constant.

The suppressor grid 64 of the valve 62 is connected directly to the terminal 65. A train of short positive voltage pulses, which will be designated boundary pulses, is applied across terminal 65 and earth. The pulse generator 131 (Figure 8) for the boundary pulses is synchronised with the sawtooth voltage oscillator 124, and produces a short voltage pulse in advance of each return stroke of the sawtooth voltage oscillation by a time equal to the time spacing of a pair of pulses. The valve 62 is biassed by a cathode biassing resistor 66, so that it is normally inoperative and may only pass anode current when the voltages of both the grids 61 and 64 are increased.

Thus when connected, as described, the valve will only pass anode current when a boundary pulse coincides with one of the pulses applied to the control grid 61. When this coincidence occurs, a negative voltage pulse will appear at the anode of the valve 62, which pulse is applied to trigger a multivibrator circuit made up by the thermionic valves 67 and 68 and their associated components. The multivibrator circuit is conventional, except that the valve 68 has a permanent positive voltage bias applied to its cathode from a potentiometer chain connected between the H. T. line and earth, so that unless triggered the circuit remains in a stable state with valve 67 conducting and valve 68 cut-off. The multivibrator may be triggered by a negative voltage pulse applied to the grid of valve 67, and then transfers to an unstable state for a period slightly longer than the time interval covering one of the said pairs of pulses, before returning to the stable state until again triggered.

For the time which the multivibrator circuit spends in the unstable state, the voltage on the anode of valve 67 is increased and that of the valve 68 is decreased compared with their values when the circuit is in the stable state. Thus at the anode of the valve 67 there is a positive voltage pulse of duration slightly longer than the time interval covering one of said pairs of pulses whenever there is a coincidence of a boundary pulse with one pulse of one of said pairs of pulses, and a corresponding negative pulse occurs similarly at the anode of valve 68.

The anode of valve 67 is connected through a coupling condenser to the suppressor grid 69 of a thermionic valve 70 which is a pentode, and the anode of valve 68 is connected similarly to the suppressor grid 71 of the pentode valve 72. The later ones of the said pairs of pulses are applied to the control grids 73 and 74 respectively of the valves 70 and 72, the common lead 75 connecting the control grids 73 and 74 together to the end of the delay line 63 remote from the terminal 60. The valves 70 and 72 act as gate valves and only pass anode current when there is a voltage pulse on the control grid 73 or 74 and the suppressor grid 69 or 71 is at the same time at the higher of the two possible voltage values. In this way valve 70 passes anode current only when a voltage pulse is applied to the grid 73 at the same time as the multivibrator circuit is in its unstable state, that is when there has been a coincidence of pulses applied to valve 62. Valve 71 passes anode current when there is a voltage pulse applied to the control grid 74 and the multivibrator circuit is in its stable state. It will be appreciated that conventional connections are also made to supply anode, screen grid and filament voltages etc. to the valves 62, 67, 68, 70 and 72 as required.

In operation, when an exploring pulse that is the first pulse of a pair of pulses is applied to the valve 62 at a different time from a boundary pulse, the valve 62 does not pass current and there is no pulse on its anode, the multivibrator circuit remains in its stable state and the gating valve 72 remains open, that is to say passing current, the other gating valve 70 being closed. The second pulse of the pair then passes through the open gating valve 72 and appears across the output terminal 78 and earth. If an exploring pulse is applied to the valve 62 at the same time as a boundary pulse, the valve 62 conducts and there is a negative voltage pulse at its anode which is applied to the multivibrator circuit and causes it to assume the unstable state. This in turn causes gating valve 70 to open, that is to pass current, and closes the other gating valve 72. The second pulse of the pair then passes through the open gating valve 70 through a delay network 76, shown conventionally as a length of concentric transmission line, and appears across the output terminal 77 and earth, delayed by virtue of its passage through the delay network 76 sufficiently to prevent coincidence with the boundary of the sawtooth voltage oscillation.

It will be seen that the reason for applying pairs of pulses to the circuit is that some delay must occur in opening the gating valve 70 and thus by using a pair of pulses the first pulse, acting as exploring pulse, although it could not open a gate in time for this pulse itself to pass through, opens the gating valve 70 in time for the second pulse of the pair to pass through.

The pulses across the output terminals 78 and 77 and earth of circuit 130 are combined in a mixer circuit 132 which may comprise a double triode valve having a common anode load and are applied to the input terminals 42 and earth of the circuit of Figure 3. The delay introduced by utilising the second of the pairs of pulses is compensated by a corresponding equal delay in the other voltage variations employed throughout the system.

When the return stroke of the sawtooth waveform cannot be made short enough to avoid unacceptable errors whilst at the same time maintaining the forward stroke sufficiently nearly linear, there may be applied to the circuit 123 of Figure 7, i. e. the circuit shown in Figure 3, from the oscillator 124 a symmetrical sawtooth voltage oscillation of the same period instead of the unsymmetrical one as previously described. The effect of this change is that time-modulated pulses occurring at the same time interval before and after a maximum of the sawtooth give rise to the same voltage at the anode of the valve 47 (Figure 3). In order to resolve this ambiguity, the pulse code modulation system previously described with reference to Figures 3 and 7 may be modified by dividing the apertures 2—6 in the coding plate 1 into two parts disposed upon either side of a central vertical zone. Referring to Figure 5 of the accompanying drawings one of these parts 80, say that on the left of the central zone 81, contains the lower apertures 2—6 of the known coding plate and the right hand part 82 contains the upper apertures 2—6 of the known coding plate, the vertical columns of apertures 2—6 in the right hand part 82 being inverted. The result is that the lowest horizontal row of apertures 2—6 in the left hand part 80 corresponds to the lowest level in the known system whereas the lowest horizontal row in the right hand part 82 corresponds to the highest level in the known system. The voltage whose amplitude is to be coded is applied, as described with reference to Figures 3 and 7, to the upper deflecting plate 7, to deflect the cathode ray beam upwards, but in the present case the beam moves up the central zone 81, its undeflected positions being on the lowest level and in the central zone 81. The unsymmetrical sawtooth waveform which is applied to deflect the cathode ray beam horizontally over the apertures 2—6 when it has come to rest after the vertical deflection is made positive or negative so that the beam is deflected over the left hand part 80 or the right hand part 82 of the coding plate 1 according to whether the time modulated pulse occurs during a first or second half-cycle of the symmetrical sawtooth oscillation respectively.

One circuit for controlling the direction of the horizontal deflection of the cathode ray beam in accordance with which half cycle of the symmetrical sawtooth oscillation a time-modulated pulse occurs will now be described with reference to Figure 6 of the accompanying drawings.

The output from the time-modulated pulse generator 121 is applied, as positive-going pulses, across the terminal 83 and earth of the circuit of Figure 6. Two thermionic valves 84 and 85, which are pentodes, have their suppressor grids 86 and 87 connected together and to the terminal 83. The valves 84 and 85 are biased by cathode resistors 88, so as to be normally cut-off. Two outputs of a square wave generator (not shown in the drawings), which outputs are in opposite phase, are connected across the terminals 89 and 90 and earth, the terminals 89 and 90 being connected directly to the control grids of the valves 84 and 85 respectively. The square wave generator is synchronised to the symmetrical sawtooth voltage oscillator 124 so that their periods are identical, the reversals of voltage of the square wave generator coinciding with the changes of direction of the sawtooth voltage oscillator.

The valves 84 and 85 will conduct only when the square-waves applied to their control grids are in a positive half cycle and a time-modulated pulse appears at the same time on the suppressor grid 86 or 87. Thus for example the valve 86 will conduct if a time modulated pulse occurs during the first half-cycle of the symmetrical sawtooth oscillation and the valve 87 if it occurs during the second half-cycle, in each case producing a negative voltage pulse at the anode.

Two tuned circuits 91 are connected one in the anode circuit of each valve 84 and 85, and when a negative voltage pulse is produced at the anode of one of the valves 84 and 85, a damped-oscillation is shock excited in the corresponding one of the tuned circuits 91. The anodes of the valves 84 and 85 are connected through coupling condensers to the grids of the valves 92 and 93 respectively. The cathodes of the valves 92 and 93 are each connected to one terminal of a condenser 94 and 95 respectively the other terminals of which are connected to earth. The first positive half-cycle of a damped oscillation applied to the grid of either of the valves 92 and 93 will cause the corresponding condenser 94 or 95 to be charged and a positive voltage to appear on the cathode of the valve 92 or 93. The cathodes of the valves 92 and 93 are connected directly to the suppressor grids of the thermionic valves 96 and 97, which are pentodes biased by cathode resistors 98 to be normally cut-off.

The positive-going asymmetrical sawtooth voltage from the oscillator 106 (Figure 7) is applied across the terminal 99 and earth, the terminal 99 being connected to the control grid 100 of the valve 96. Similarly a negative-going asymmetrical sawtooth voltage is applied across the terminal 101 and earth, the terminal 101 being connected to the control grid 102 of the valve 97. The asymmetrical sawtooth voltages recur at intervals at which it is desired to sweep the cathode ray beam across the apertures 2—6 of the coding plate 1. When either of the condensers 94 and 95 becomes charged, a positive voltage is applied to the suppressor grid of the corresponding one of the valves 96 and 97, and the asymmetrical sawtooth voltage applied to the grid of the valve 96 or 97 is amplified and appears inverted across the corresponding output terminal 103 or 104 and earth.

It will be seen therefore that if a time-modulated pulse occurs during the first half-cycle of the symmetrical sawtooth oscillation a negative-going asymmetrical sawtooth voltage appears across the terminals 103 and earth and there is no change of voltage between the terminal 104 and earth, whilst if the time-modulated pulse occurs in the second half-cycle, a positive going sawtooth voltage appears across terminals 104 and earth and there is no change of voltage between the terminal 103 and earth. The terminals 103 and 104 are connected together either directly or through a mixer-amplifier stage to the right deflecting plate 10 (Figure 7) of the cathode ray tube. Thus if the time modulated pulse occurs in a first half-cycle of the symmetrical sawtooth oscillation, the cathode ray beam is deflected to the left from the central zone 81 of the coding plate of Figure 5 and if it occurs in a second half cycle the cathode ray beam is deflected to the right from the central zone 81.

Other conventional circuit connections are made to supply the anode, screen and filament voltages etc. of the above circuit as required. It is also necessary to discharge the condensers 94 and 95 after they have been charged and the requisite sawtooth voltage has been passed to the cathode ray tube. This is effected by applying positive voltage pulses from the oscillator 106 across each of the terminals 105 and earth, which pulses occur shortly after the return strokes of the asymmetrical sawtooth voltages. The terminals 105 are connected to the control grids of thermionic valve 106, which are triodes and are biassed by cathode resistors 107 to be normally non-conducting. The positive pulses cause the valves 106 to conduct and the condensers 94 and 95 are discharged by the current flowing through them.

A difficulty of the same kind as has been referred to previously may arise owing to a time-modulated pulse occurring during the change of the square waveform from positive to negative and vice versa. The difficulty may be overcome by connecting the circuit described with reference to Figure 4 between the output of the time-modulated pulse producer and the output of the circuit of Figure 6, with the modification that the frequency operation of the boundary pulse generator is made double that previously described with reference to Figure 7 so that a boundary pulse occurs just before each transition of the rectangular waveform positive to negative and vice versa. Any time-modulated pulses occurring at these transitions are then slightly delayed to occur after the transition. As in the previous case the pulses applied to the circuit of Figure 6 will all have to be delayed by the same amount as the second of each pair of pulses on the first of the same pair.

A further arrangement, in which a symmetrical sawtooth voltage oscillation is employed, may be made as follows. As in the arrangement, described with reference to Figures 5 and 6 of the accompanying drawings, the coding plate 1 is divided into two parts, but is slightly modified from the arrangement shown in Figure 5, in that the apertures in the right hand part 82 are the other way round, that is the apertures 6 are in the right hand column in the part 82 of the coding plate 1 as well as in the left hand part 80.

Two similar circuits, such as that described with reference to Figure 3 of the accompanying drawings are employed, the time-modulated pulses being applied to each circuit as previously described. In one of the circuits a symmetrical sawtooth voltage oscillation from a suitable oscillator is applied instead of the antisymmetrical sawtooth voltage oscillation, and in the other a square wave voltage oscillation from a suitable oscillator is applied, the two said substituted oscillations having the same period as the antisymmetrical sawtooth voltage oscillation and being in phase with it. In all other respects the two circuits are the same as that described with reference to Figure 3, excepting also that the output terminal 54, of the one to which a square wave voltage oscillation is applied, is connected to the left deflecting plate 11 of the cathode ray tube instead of to the upper deflecting plate 7.

The undeflected portion of the cathode ray beam is arranged to be to the extreme right of all the apertures 2–6 and in the lowest level. If a time modulated pulse occurs during a first half-cycle of the square wave and symmetrical sawtooth voltage oscillations, a voltage will be applied to the upper deflecting plate 7, which will deflect the cathode ray beam up the coding plate 1 to a level depending on the time of occurrence of the time modulated pulse and a voltage will be applied to the left deflecting plate 11, which will deflect the beam into the central zone 81. If on the other hand, the time modulated pulse occurs during a second half-cycle, a voltage will be applied to the upper deflecting plate 7 as before, but no voltage will be applied to the left deflecting plate 11, since the square wave is in its negative half-cycle and the condenser 53 of the circuit to which it is applied will not therefore be charged, and the beam will not be deflected away from the right hand end of the coding plate 1.

When the asymmetrical sawtooth voltage is applied between the left and right deflecting plates 10 and 11, it is arranged to sweep the cathode ray beam to the left across only half the coding plate 1, and if the time modulated pulse occurs in a said first half cycle, the cathode ray beam will be swept across the apertures to the left of the central zone 81, whereas if it occurs in a said second half-cycle it will be swept across the apertures to the right of the central zone 81.

To prevent false pulses being transmitted due to the beam sweeping across the coding plate 1 whilst moving from its undeflected position to a deflected position in the central zone 81, it can be arranged that the cathode ray beam is suppressed, for the period in which the deflection may occur, for example by applying a negative pulse to the control grid of the cathode ray tube.

The difficulty may arise again in the above arrangement of a time modulated pulse occurring during a transition from positive to negative or vice versa of the rectangular wave or the transition of the symmetrical sawtooth and thereby giving false coding. As before this may be avoided by connecting the circuit described with reference to Figure 4 between the output of the time-modulated pusle producer and the inputs of the said two circuits to which the symmetrical sawtooth and square wave voltage oscillations are applied, the boundary pulses occurring slightly before each said transition.

Although the invention has been described with particular reference, for the generation of the second train of coded pulses, to the form of pulse code modulation system described in the paper previously mentioned, it is of course not limited to such coding apparatus but may be applied to any suitable form of coding apparatus.

It will be appreciated that the signal voltage applied to the pulse code modulation system may represent many different kinds of intelligence and that although the systems described all generated coded pulses to represent the magnitude of a signal voltage, the invention may equally be applied where the coded pulses represent the magnitude of some other quantity than a signal voltage, for example, a signal current.

Although in the methods described above the sets of M and *m* fixed values are distributed at regular intervals the invention is not limited to such methods. It may be found convenient, for example, to distribute the fixed values logarithmically over the ranges.

I claim:

1. An electric pulse code modulation system for periodically generating a group of coded pulses representative of the instantaneous value of a magnitude which may vary within a first given range, comprising a cathode ray tube coding apparatus including a coding plate, means for producing a cathode ray beam and directing same at the coding plate, means for deflecting the beam from a datum level in response to a signal lying within a second given range to one of *m*, where *m* is any integer greater than two, fixed levels corresponding to the nearest one, in a predetermined relation to the signal, of *m* corresponding signal values, which are distributed at intervals and define a range covering the second given range, and means for returning the beam to its datum level if it is deflected beyond the level corresponding to the maximum signal value; means for periodically sampling the instantaneous value of said magnitude and for deriving at each sample a signal for application to the deflecting means of said coding apparatus, the range of variation of the amplitude of the signals being scaled in relation to the second given range so that it is M, where M is any integer greater than two, times as great, said signal reaching its maximum amplitude in a finite interval of time, means for counting the number of times in response to each said signal the cathode ray beam is returned to its datum level and for deriving a first train of coded pulses in accordance with the said number, means for deriving a second train of coded pulses from the coding apparatus representative of the level on the coding plate at which the cathode ray beam finally comes to rest, and means for combining the first and second trains of coded pulses to form the required group of coded pulses.

2. An electric pulse code modulation system for periodically generating a group of coded pulses representative of the instantaneous value of a magnitude which may vary within a given range, comprising a pulse-time modulator circuit for generating a train of recurrent pulses occurring one within each of a train of regularly recurrent equal fixed intervals at a time depending on the instantaneous value of said magnitude, coding means for generating a first train of coded pulses representative of the nearest one, in a predetermined relation to the time of occurrence of each of said train of recurrent pulses, of a set of M, where M is any integer greater than two, instants which set is distributed at intervals over the fixed interval in which said pulse occurs, means for deriving a signal dependent on the time interval between the time of occurrence of each of said train of recurrent pulses and the said nearest one of the corresponding set of M instants, a second coding means, means for applying said signal to the second coding means for generating a second train of coded pulses representative of the nearest one, in the said predetermined relation to the time of occurrence of each of said train of recurrent pulses, of a set of *m*, where *m* is any integer greater than two, instants distributed at intervals over the interval defined by the two consecutive ones of the set of M instants between which each said recurrent pulse occurs, and means for combining the first and second trains of coded pulses to form the required group of coded pulses.

3. An electric pulse code modulation system for periodically generating a group of coded pulses representative of the instantaneous value of a magnitude which may vary within a given range, comprising a pulse-time modulator circuit for generating a train of recurrent pulses occurring one within each of a train of regularly recurrent equal fixed intervals at a time depending on the instantaneous value of said magnitude, coding means for generating a first train of coded pulses representative of the nearest one, in a predetermined relation to the time of occurrence of each of said train of recurrent pulses, of a set of M, where M is any integer greater than two, instants which set is distributed at intervals over the fixed interval in which said pulse occurs, means for automatically delaying any one of said train of recurrent pulses which coincides with one of the said set of M instants by a time sufficient to prevent said coincidence, means for deriving a signal dependent on the time interval between the time of occurrence of each of said train of recurrent pulses and the said nearest one of the corresponding set of M instants, a second coding means, means for applying said signal to the second coding means for generating a second train of coded pulses representative of the nearest one, in the said predetermined relation to the time of occurrence of each of said train of recurrent pulses, of a set of $m$, where $m$ is any integer greater than two, instants distributed at intervals over the interval defined by the two consecutive ones of the set of M instants between which each said recurrent pulse occurs, and means for combining the first and second trains of coded pulses to form the required group of coded pulses.

4. An electric pulse code modulation system for periodically generating a group of coded pulses representative of the instantaneous value of a magnitude which may vary within a given range, comprising a pulse-time modulator circuit for generating a train of recurrent pulses occurring one within each of a train of regularly recurrent equal fixed intervals at a time depending on the instantaneous value of said magnitude, coding means for generating a first train of coded pulses representative of the nearest one, in a predetermined relation to the time of occurrence of each of said train of recurrent pulses, of a set of M, where M is any integer greater than two, instants which set is distributed at intervals over the fixed interval in which said pulse occurs, means for deriving a voltage pulse of an amplitude which may vary within a second range in dependence upon the time interval between the time of occurrence of each of said train of recurrent pulses and the said nearest one of the corresponding set of M instants, a cathode ray tube coding apparatus including a coding plate, means for producing a cathode ray beam and directing same at the coding plate, means for deflecting the beam from a datum level in response to an applied signal voltage lying within said second range, to one of $m$, where $m$ is any integer greater than two, fixed levels corresponding to the nearest one, in a predetermined relationship to the signal amplitude, of $m$ corresponding signal voltage values which are distributed at intervals and define a range covering the said second range, and means for deriving a train of coded pulses characteristic of each of said $m$ levels, means for applying each said voltage pulse to the deflection means in said coding apparatus to derive a second train of coded pulses representative of one of the set of $m$ instants corresponding to the one of the levels to which the beam is deflected, said instants being distributed at intervals over the interval defined by the two consecutive ones of the set of M instants between which each said recurrent pulse occurs, and means for combining said first and second trains of coded pulses to form the required group of coded pulses.

5. A pulse code modulation system for periodically generating coded pulses representative of the instantaneous value of a magnitude which may vary within a given range, comprising a pulse-time modulator circuit for generating a train of recurrent pulses occurring one within each of a train of regularly recurrent equal fixed intervals at a time depending on the instantaneous value of said magnitude, coding means for generating a first train of coded pulses representative of the nearest one, in a predetermined relation to the time of occurrence of each of said train of recurrent pulses, of a set of M, where M is any integer greater than two, instants which set is distributed at intervals over the fixed intervals in which each said pulse occurs, coding means for generating a second train of coded pulses representative of the nearest one, in a predetermined relation to the time of occurrence of each of said train of recurrent pulses a set of $m$, where $m$ is any integer greater than two, instants distributed at intervals over the interval defined by the two consecutive ones of the set of M instants between which each said recurrent pulse occurs, and means for automatically delaying any one of said train of recurrent pulses which coincides with one of the said set of M instants, by a time sufficient to prevent said coincidence.

References Cited in the file of this patent

UNITED STATES PATENTS

| | | |
|---|---|---|
| 2,272,070 | Reeves | Feb. 3, 1942 |
| 2,458,652 | Sears | Jan. 11, 1949 |
| 2,463,535 | Hecht | Mar. 8, 1949 |
| 2,473,691 | Meacham | June 21, 1949 |
| 2,530,538 | Rack | Nov. 21, 1950 |
| 2,537,843 | Meacham | Jan. 9, 1951 |

OTHER REFERENCES

Coded Pulse Modulation Minimizes Noise, pages 126–131 inclusive of "Electronics," December 1947.

"Pulse Code Modulation Using Electron Beam Tubes," by Sears et al., Bell System Monograph B–1518, 1948.